(12) United States Patent
Cyr

(10) Patent No.: US 7,227,645 B2
(45) Date of Patent: Jun. 5, 2007

(54) METHOD AND APPARATUS FOR MEASURING POLARIZATION MODE DISPERSION

(75) Inventor: Normand Cyr, Sainte-Foy (CA)

(73) Assignee: EXFO Electro-Optical Engineering Inc., Quebec (CA)

( * ) Notice: Subject to any disclaimer, the term of this patent is extended or adjusted under 35 U.S.C. 154(b) by 0 days.

(21) Appl. No.: 10/544,638

(22) PCT Filed: Feb. 6, 2003

(86) PCT No.: PCT/CA03/00151

§ 371 (c)(1),
(2), (4) Date: Aug. 5, 2005

(87) PCT Pub. No.: WO2004/070341

PCT Pub. Date: Aug. 19, 2004

(65) Prior Publication Data

US 2006/0164652 A1     Jul. 27, 2006

(51) Int. Cl.
*G01B 9/02* (2006.01)
(52) U.S. Cl. ...................... 356/491; 356/73.1
(58) Field of Classification Search ............... 356/73.1, 356/491, 479, 497, 517
See application file for complete search history.

(56) References Cited

U.S. PATENT DOCUMENTS 6,654,105 B2 * 11/2003 Wang et al. ............... 356/73.1

OTHER PUBLICATIONS

P. Oberson, K. Julliard, N. Gisin, R. Passy. and J.P. Von der Weid, "Interferometric polarization mode dispersion measurements with femtosecond sensitivity," J. Lightwave Technol., vol. 15, pp. 1852-1857, 1997.*

* cited by examiner

Primary Examiner—Hwa (Andrew) Lee
(74) Attorney, Agent, or Firm—Thomas Adams

(57) ABSTRACT

Apparatus for measuring polarization mode dispersion (PMD) of a device, e.g. a waveguide, comprises a broadband light source (10,12) for passing polarized broadband light through the device (14), an interferometer (20) for dividing and recombining light that has passed through the device to form interferograms, a polarization separator (30) for receiving the light from the interferometer and separating such received light along first and second orthogonal Feb. 25, 2003 Feb. 25, 2003 polarization states, detectors ($32_x, 32_y$) for converting the first and second orthogonal polarization states, respectively, into corresponding first and second electrical signals ($P_x(\tau), P_y(\tau)$), and a processor (36) for computing the modulus of the difference and such, respectively, of the first and second electrical signals to produce a cross-correlation envelope ($E_C(\tau)$) and an auto-correlation envelope ($E_c(\tau)$), and determining the polarization mode dispersion according to the expression PMD=where and τ is the delay difference between the paths of the interferometer.

6 Claims, 2 Drawing Sheets

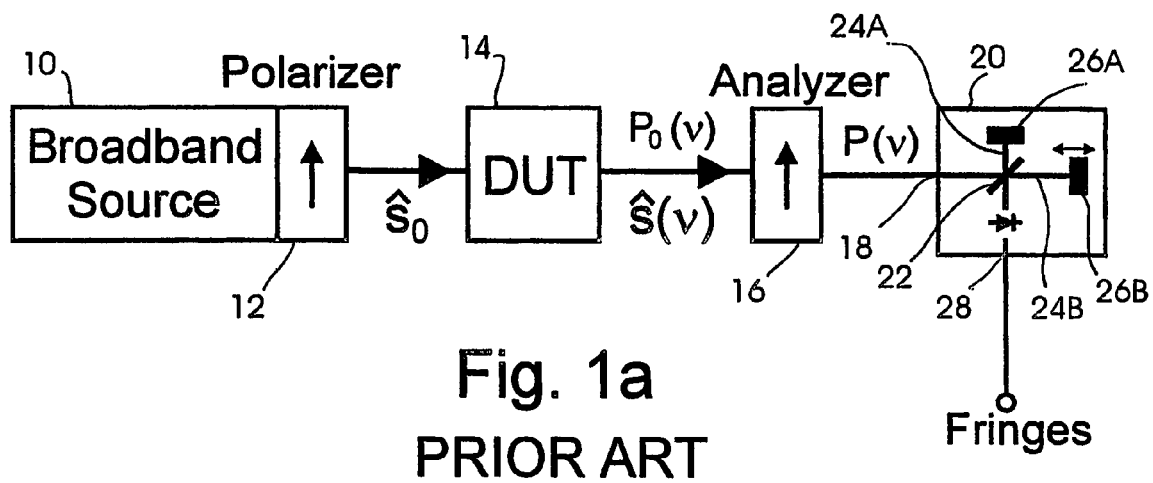
Fig. 1a
PRIOR ART
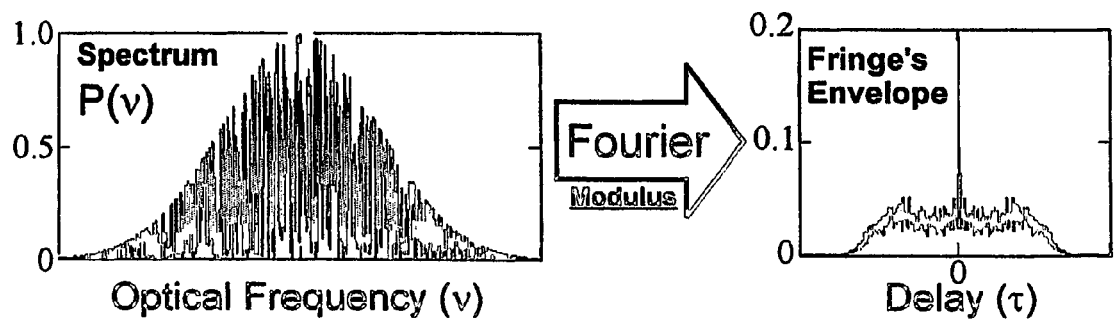
Fig. 1b
Fig. 1c

METHOD AND APPARATUS FOR MEASURING POLARIZATION MODE DISPERSION

TECHNICAL FIELD

This invention relates to a method and apparatus for measuring polarization mode dispersion (PMD) in optical devices, especially in waveguides such as are used in optical communications systems.

BACKGROUND ART

It is well known that PMD may be measured by injecting wideband linearly polarized light into the waveguide, passing the light leaving the waveguide through a linear polarizer and then sending it to a scanning interferometer, recombining the light from the two arms of the interferometer to produce interferograms, converting the recombined light intensity, I, into a corresponding electrical signal and processing the electrical signal to extract the PMD from a curve, $I(\tau)$, of intensity I against the path delay difference $\tau$ between the two arms of the interferometer (referred to hereinafter as delay $\tau$).

As explained in U.S. Pat. No. 5,712,704 (Martin et al.), the curve $I(\tau)$ exhibits a high central peak, with smaller fluctuations that can be seen on either side. (Similar fluctuations at the centre are masked by the central peak.) The central peak is representative of the light spectrum at the output of the waveguide (before the linear polarizer) while the fluctuations represent the PMD. According to Martin et al., this peak "hinders the processing of the detected signal, thereby constituting an obstacle to the accurate measurement of the PMD".

Martin et al. discussed a previously-disclosed technique which removed the central peak by passing the light by way of a first polarizer at 45° to an interferometer having a polarizer at 0° in one arm and a polarizer at 90° in its other arm, and passing the recombined light through an analyzer (analysis polarizer) at 0°. Having identified complex construction and the use of the analyzer as unsatisfactory, Martin et al. sought to provide a simpler way of removing the central peak. In particular, Martin et al. provided at least one birefringent element having two independent modes of polarization in at least one of the arms of the interferometer, the algebraic sum of the elementary phase shifts in the two arms being equal to a relative phase shift and the algebraic difference between the two relative phase shifts having a value of $\pi$. According to Martin et al., this allows the curve of intensity I against delay $\tau$ to be obtained without the "parasitic" central peak.

Neither of these approaches is entirely satisfactory, however, because they are predicated upon removal of the "parasitic" central peak on the grounds that it detracts from the measurement of PMD, so that simple removal of the central peak should significantly improve measurement accuracy. This is only true in part. In fact, removing the central peak means that useful information is discarded, as a result of which very small PMDs, tending towards zero, cannot be measured accurately. In practice, improvement of measurement accuracy is marginal.

DISCLOSURE OF INVENTION

The present invention seeks to at least mitigate the defciencies of these know PMD measurement techniques, or at least provide an alternative.

According to one aspect of the present invention, apparatus for measuring polarization mode dispersion (PMD) of an optical waveguide comprises:

(i) broadband light source means for applying polarized broadband light to one end of the waveguide, (ii) an interferometer having an input port for receiving said light from the waveguide, an output port, means for dividing the light into first and second components, first and second paths for conveying the first and second components, respectively, to said output port for recombination, and means for varying the length of one of the first and second paths relative to the other to cause interference between the components upon recombination, (iii) a polarization separator for receiving the recombined light from the output port and separating said recombined light into first and second interferograms having orthogonal polarization states, (iv) detection means for converting the first and second interferograms, respectively, into corresponding first and second electrical interferogram signals ($P_x(\tau),P_y(\tau)$), and (v) means for processing the first and second electrical interferogram signals to produce a cross-correlation envelope ($E_C(\tau)$ and an auto-correlation envelope ($E_A(\tau)$), and determining from the cross-correlation envelope and the auto-correlation envelope the polarization mode dispersion (PMD) of the waveguide.

According to a second aspect of the invention, a method of measuring polarization mode dispersion of a waveguide comprises the steps of:

(i) passing polarized broadband light through the waveguide;

(ii) using an interferometer (20), dividing and recombining the light leaving the waveguide to produce interferograms;

(iii) separating the recombined light into first and second interferograms having orthogonal polarization states, (iv) converting the first and second interferograms, respectively, into corresponding first and second electrical interferogram signals ($P_X(\tau),P_Y(\tau)$), and (v) processing the first and second electrical interferogram signals to produce a crass-correlation envelope ($E_C(\tau)$) and an auto-correlation envelope ($E_A(\tau)$, respectively, and determining from the cross-correlation envelope and the auto-correlation envelope the polarization mode dispersion (PMD) of the waveguide, and (vi) providing a signal representing the measured PMD of the waveguide.

In embodiments of either aspect of the invention, the cross-correlation envelope ($E_C(\tau)$) may be computed as the modulus of the difference between the first and second electrical interferogram signals and the auto-correlation envelope $E_A(\tau)$) as the modulus of the sum of the first and second electrical interferogram signals according to the expressions:

$$E_C(\tau) = |P_X(\tau) - P_X(\tau)| \text{ and } E_A(\tau) = |P_X(\tau) + P_Y(\tau)|$$

Preferably, the polarization mode dispersion (PMD) is computed from the cross-correlation $E_C(\tau)$) and the auto-correlation ($E_A(\tau)$) according to the expression $$PMD = \sqrt{\frac{3}{2}(\sigma^2 - \sigma_0^2)}$$

where $\sigma^2 = \dfrac{\int \tau^2 E_A^2(\tau) d\tau}{\int E_A^2(\tau) d\tau}$ and $\sigma_0^2 = \dfrac{\int \tau^2 E_A^2(\tau) d\tau}{\int E_A^2(\tau) d\tau}$ and τ is the delay between the first and second paths of the interferometer.

BRIEF DESCRIPTION OF THE DRAWINGS

An embodiment of the invention will now be described by way of example only with reference to the accompanying drawings, in which:

FIG. 1(a) labelled PRIOR ART illustrates conventional apparatus for measuring polarization mode dispersion (PMD) of a waveguide under test;

FIG. 1(b) illustrates the power spectrum, as a function of optical frequency ν, of light leaving an analyzer in the apparatus;

FIG. 1(c) illustrates the fringe envelope, as a function of the delay τ, at the output of an interferometer in the apparatus;

DETAILED DESCRIPTION OF PREFERRED EMBODIMENTS

Figure 1D:
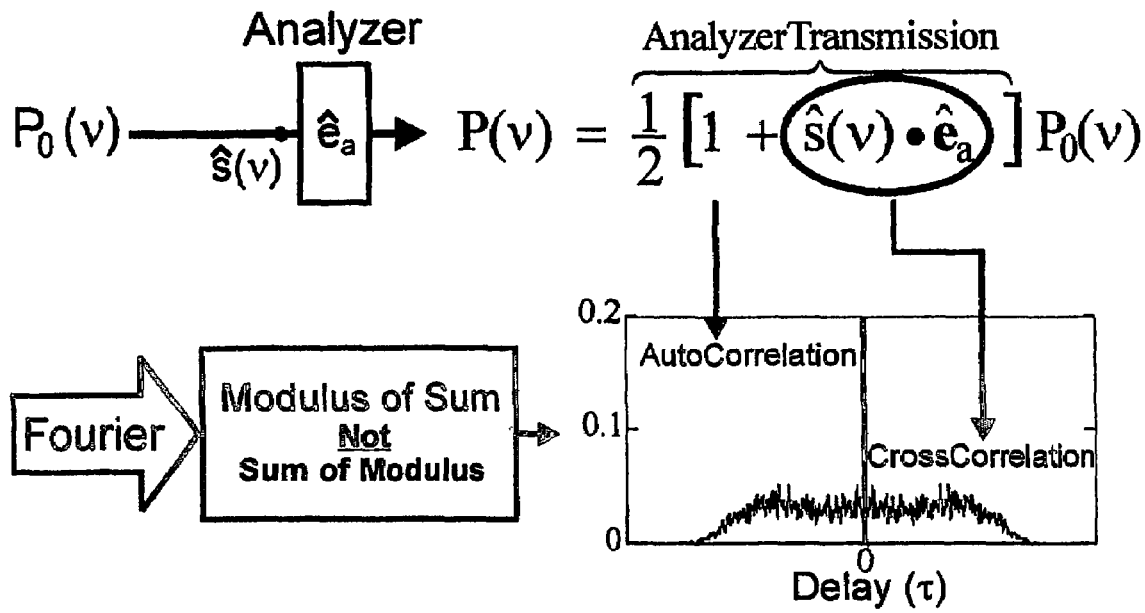
FIG. 1(d) illustrates, with the help of power spectrum the physical origin of auto-correlation and cross-correlation parts of the fringe envelope.

The known apparatus illustrated in FIG. 1 comprises a broadband polarized light source means comprising a broadband light source 10, for example a light emitting diode, erbium doped fiber source, and so on, and a polarizer 12 (conveniently a linear polarizer) for polarizing the light from source 10 and applying the polarized light, with state of polarization $\hat{s}_0$, to an input of a device-under-test (DUT) 14, for example an optical fibre or other kind of waveguide. Light leaving the DUT 14 and having an optical frequency dependent state of polarization $\hat{s}(\nu)$ and power $P_0(\nu)$ is applied via an analyzer 16, conveniently another linear polarizer, to an input port 18 of an interferometer 20, shown as a Michelson interferometer.

The interferometer 20 comprises a splitter or separator 22, for example a semi-reflective plate inclined at 45° or a 50-50 fibre coupler, for splitting the light received from the analyzer 16 into two component interference beams 24A and 24B, respectively, and for recombining the interference beams, following their reflection by mirrors 26A and 26B, respectively, to form a recombined light beam which leaves the interferometer 20 via an output port 28.

Mirror 26A is fixed while mirror 26B is movable to vary the length of the path traversed by interference beam 24B relative to that traversed by interference beam 24A. In operation, the scanning mirror 26B is moved to and fro to vary the path length and hence the path delay difference τ between the two arms so that the interference beams 24A and 24B interfere when recombined at the output of the interferometer 20. FIG. 1(c) shows the resulting interferogram at the output port of the interferometer 20 (more precisely the interference fringe envelope, or fringe visibility as a function of delay τ).

As shown in FIG. 1(b), when there is an analyzer 16 at the output of DUT 14, the spectrum of the light entering the interferometer 20 may have an overall bell shape, but with large fluctuations. In effect, the interference fringe envelope produced by interferometer 20, shown in FIG. 1(c), is the modulus of the Fourier transform of the spectrum. FIG. 1(d) illustrates the derivation of the interferogram from the following expression for the spectrum:

$$P(\nu) = \frac{1}{2} P(\nu)[1 + \hat{s}(\nu) \cdot \hat{e}] \quad (1)$$

where $\hat{e}_a$ is the maximum transmission axis of the analyzer 16.

As can be seen from FIGS. 1(c) and 1(d), and the term in the square brackets in equation (1), the spectrum of the light leaving the analyzer 16 can be expressed as the sum of the two parts, one part being independent of the state of polarization $\hat{s}(\nu)$; the so-called central peak originates from this part. The central peak is the auto-correlation, i.e. the modulus of the Fourier transform of the spectrum $P_0(\nu)$ at the input of the analyzer 16 (see FIG. 1(d)), it is independent of the fluctuations of the state of polarization $\hat{s}(\nu)$ and hence of the PMD. It should be noted that the maximum of the auto-correlation peak at the centre (delay=0) has been set to 1; the graph is scaled to show the cross-correlation part more clearly.

The second part of the term in the square brackets in equation (1) is dependent upon state of polarization and results in the cross-correlation part of the interferogram in FIG. 1(d); it has some given value at the center, but no large central peak. It should be noted that FIG. 1(d) is provided simply to facilitate a basic understanding. This apparatus measures interferograms directly; no spectrum is measured.

In such a conventional interferometric PMD measuring apparatus, the overall envelope in FIGS. 1(c) and 1(d) is not the sum of the two envelopes, i.e., auto-correlation and cross-correlation; they interfere in the centre portion (modulus of sum, not sum of modulus). Where the PMD is relatively large, e.g., 10 ps, the width of the cross-correlation envelope is much larger than the width of the auto-correlation peak, so the presence of the auto-correlation peak is not of great concern. It should be noted that the maximum of the auto-correlation peak at the centre (delay=0) has been set to 1: the scale of the graph is increased in order to show the cross-correlation part more clearly.

The approach taught by U.S. Pat. No. 5,712,704 is to remove this auto-correlation peak by omitting the analyzer and inserting a waveplate in one arm of the interferometer 20. This is not entirely satisfactory, however, because it discards information that is particularly useful when measuring very low values of PMD. This so-called parasitic central peak is not just a parasite. Knowledge of it, obtained by extracting both the cross-correlation and the auto-correlation, separately, without one interfering with the other at center, can be used to great advantage.

Figure 2:
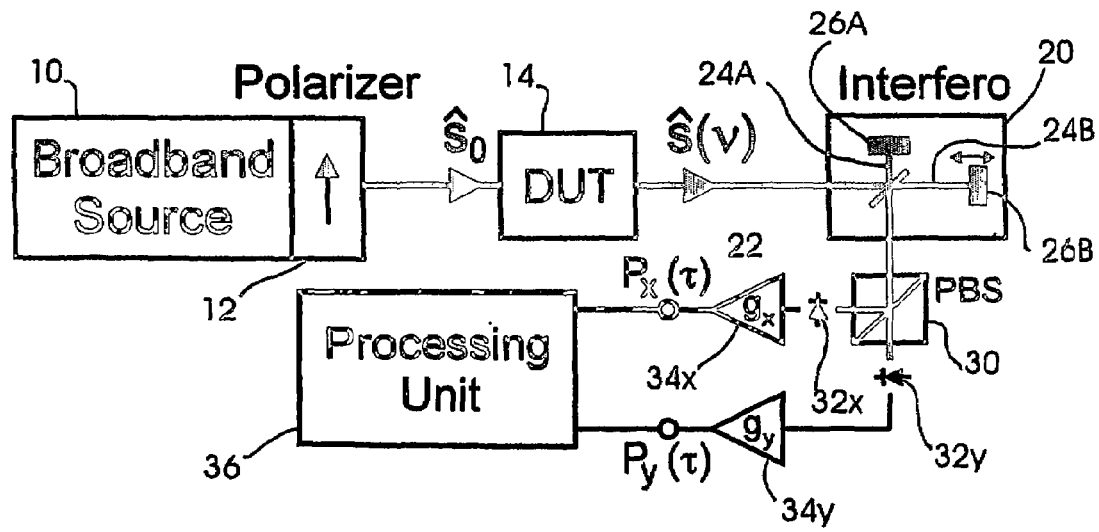
FIG. 2 illustrates an embodiment of the present invention.

Thus, embodiments of the present invention do not discard the auto-correlation peak but rather use it to improve the accuracy of the PMD measurement, especially where PMD is very small. Such an embodiment will now be described, as an example, with reference to FIG. 2 in which components corresponding to those shown in FIG. 1(a) have the same reference numerals. The operation of the apparatus shown in FIG. 2 is similar in many respects to that of the apparatus shown in U.S. Pat. No. 5,712,704 and so, for convenience, will not be described in detail here. For further information, the reader is directed to U.S. Pat. No. 5,712,704, incorporated herein by reference.

The apparatus shown in FIG. 2 differs from that shown in FIG. 1(a) in that the analyzer 16 is omitted and a polarization beam splitter (PBS) 30 is disposed with its input port coupled to the output port 28 of the interferometer 20 and its output ports coupled to first and second photodetectors $32_X$ and $32_Y$, respectively. The electrical outputs of the photodetectors $32_X$ and $32_Y$ (optionally) amplified by amplifiers $34_X$ and $34_Y$, are monitored by a processor 36.

The PBS 30 splits the recombined light beam into two interferogram components $P_X(\tau)$ and $P_Y(\tau)$ having mutually orthogonal states of polarization, and supplies the two interferogram components to the photodetectors $32_X$ and $32_Y$, respectively, for conversion into corresponding electrical signals which are amplified and supplied to processor 36.

The processor 34 processes the electrical signals to extract the interferograms for both states of polarization and uses them to compute the PMD of the DUT 14. More particularly, the processor 36 obtains the auto-correlation envelope $E_A(\tau)$ and cross-correlation envelope $E_C(\tau)$ by computing the sum and difference of the electrical signals from the two photodetectors $32_X$ and $32_Y$. Thus, where $P_X(\tau)$ and $P_Y(\tau)$ are the two interferograms as functions of the delay difference $\tau$ between the two arms of the interferometer 20, Auto-correlation $E_A(\tau)$ and Cross-correlation $E_C(\tau)$ are derived as follows:

$$E_A(\tau)=|P_X(\tau)+P_Y(\tau)| \text{ and } E_C(\tau)=|P_X(\tau)-P_Y(\tau)| \quad (2)$$

The main difference in the subsequent processing, as compared with that described in U.S. Pat. No. 5,712,704, is that the PMD is computed using the expression $$PMD = \sqrt{\frac{3}{2}(\sigma^2 - \sigma_0^2)}. \quad (3)$$

where $\sigma_0^2$ is the rms width of the squared auto-correlation envelope, just as $\sigma$ is the rms width of the squared cross-correlation envelope. The formula used to obtain $\sigma$ and $\sigma_0^2$ is the same in both cases as follows:

$$\sigma^2 = \frac{\int \tau^2 E_C^2(\tau)d\tau}{\int E_C^2(\tau)d\tau} \text{ and } \sigma_0^2 = \frac{\int \tau^2 E_A^2(\tau)d\tau}{\int E_A^2(\tau)d\tau} \quad (4)$$

As can be seen from equation (3), a known offset $\sigma_0^2$ is subtracted from $\sigma^2$ to obtain the PMD value; $\sigma_0^2$ is indeed independent of the PMD value since, according to equation (4), it is deduced from the separate auto-correlation envelope. Thus, owing to the fact that both the auto-correlation envelope and the cross-correlation envelope are extracted separately, without one interfering with the other, the offset $\sigma_0^2$ can be computed according to equation (4) and subtracted from $\sigma^2$ according to equation (3).

The following practical advantages follow from knowing and subtracting this offset $\sigma_0^2$, when computing PMD:

1. Independence from the spectrum shape: the technique becomes insensitive to the width and shape of the spectrum $P_0(n)$, notably insensitive to ripples on the spectrum (e.g. multi-path interference (MPI) effects), filtering by the DUT, etc.), which phenomena currently are true practical limitations of commercially available Interferometric PMD analyzers. Whatever the shape of the spectrum, it actually translates as an offset $\sigma_0^2$ on the observed $\sigma^2$.

2. Measurement of PMD as small as PMD=0: It should be appreciated that, when the PMD value is small, i.e. not so much larger than $\sigma_0$, or in the same order of magnitude, knowing the offset is more than a marginal advantage. In fact, embodiments of the present invention are truly capable of returning the result PMD=0, when PMD=0, which is not the case with currently available analyzers which, when PMD=0, return a $$PMD \text{ value} \approx \sigma_0 \sqrt{\frac{3}{2}},$$

i.e. the offset value. Of course, when PMD is large, this may not be a concern.

3. Measurement through EDFAs (Erbium-Doped Fibre Amplifiers) is facilitated: as a corollary, the above-described properties of embodiments of the present invention make it possible in practice to use the interferometric PMD analyzer for measuring fibre links that comprise EDFAs, which is very advantageous.

When going through an EDFA, the spectrum at the output of the link is much narrower than the spectrum of the input broadband source, and does not have a smooth shape. Consequently, the auto-correlation width ($\sigma_0$) is much larger than it is when measuring a typical "passive" fibre (noting that, as shown in FIG. 1(d), the auto-correlation interferogram is the Fourier transform of the spectrum of the light at the input of the interferometer (with no analyzer, as in FIG. 2)). Moreover, and obviously, the spectrum after going through EDFA's cannot be considered to be known in advance with precision in all cases. In essence, measuring the auto-correlation in addition to the cross-correlation is measuring the only characteristic of the spectrum that has to be known according to equation (3), i.e. the rms width of the corresponding auto-correlation $\sigma_0$, (squared). With EDFAs, $\sigma_0$ may be in the picosecond range instead of ~30 fs when there is only the fibre. That cannot be ignored as "negligible".

It should be noted that there is also unpolarized noise at the output when there is an EDFA present since, like electronic amplifiers, optical amplifiers have a finite "noise figure". The cross-correlation interferogram does not contain a contribution of the ASE noise to $\sigma$. Nevertheless, this constitutes a limitation because interferograms (fringes) are in fact superimposed on a constant offset (total power), i.e., constant as a function of delay $\tau$. Thus, if ASE is too large, it means that the signal/noise ratio can be significantly degraded in practice.

It should be appreciated that the processor 36 may have means for storing the two observed interferograms, $P_X(\tau)$ and $P_Y(\tau)$, in order to be able to compute afterwards the sum and difference according to equations (2). (possibly using a separate computer). Alternatively, the processor 36 may be arranged to compute the sum and difference in real time (electronically, analogically, or numerically).

Various other modifications are envisaged within the scope of the present invention. For example, the PBS 30 could be replaced by an ordinary beamsplitter (i.e. not polarization-selective), and two polarizers, each placed in front of one of the two photodetectors, one polarizer with its axis orthogonal to the axis of the other. Alternatively, again with an ordinary beamsplitter instead of a PBS 30, one polarizer could be placed in front of one photodetector, and no polarizer placed in front of the other, to obtain interferograms $P_X(\tau)$ and $P_0(\tau)$ respectively: in this latter case, the calculation to deduce auto-correlation and cross-correlation envelopes from the two raw interferograms differs from equation (2), but still employs simple sums and differences, as follows:

$$E_C(\tau)=|2P_X(\tau)-P_0(\tau)| \text{ and } E_A(\tau)=|P_0(\tau)| \quad (5)$$

It is envisaged that the invention could be implemented using detection along any two "distinct" polarization axes (distinct meaning "not strictly identical), provided that they are precisely known (i.e. the angle between the two axes is precisely known). They need not be orthogonal (at 180° on the Pointcaré sphere).

The invention is not limited to the measurement of PMD in waveguides, e.g. fibers (even multimode fibers but for "open space" or "bulk" optical devices, or optical components with integrated waveguides. Basically, the DUT 14 may be any device whose light output can be collected into a substantially collimated beam. Other options include:

The "bulk" device can have fiber pigtails at input and output;

The interferometer can have a fiber input (with a lens to form a collimated beam);

A collimated beam can be launched into the interferometer with no fiber input.

While the above-described embodiment has a schematic Michelson interferometer, more specifically the simpler Michelson interferometer, with one arm of fixed delay, it would be feasible to use a Michelson interferometer with the delays of the two arms varying, but with only one, two-sided moving mirror: the delay in one arm decreases when it increases in the other arm, and vice-versa: this doubles the delay range that is scanned with a given physical travel of the moving mirror.

Alternatively a Mach-Zehnder type of interferometer could be used, in which there is no mirror, the two paths simply being recombined on a second output beamsplitter.

Whether a Michelson type or Mach-Zehnder type, the interferometer may be a fiber interferometer: the "free-space" beamsplitter(s) being replaced by a fiber coupler.

Generally, therefore, embodiments of the invention may explore any two-path interferometer with a variable path delay difference, that recombines the light from the two paths into one common path, i.e. into one fiber or into two substantially superimposed light beams (not necessarily collimated, providing the two beams from the two paths have substantially the same direction of propagation and radius of curvature of the wavefronts).

The invention claimed is:

1. Apparatus for measuring polarization mode dispersion (PMD) of an optical waveguide, comprising:
   (i) broadband light source means (10,12) for applying polarized broadband light to one end of the waveguide (14),
   (ii) an interferometer (20) having an input port (18) for receiving said light from the waveguide (14), an output port (28), means (22) for dividing the light into first and second components (24A,24B), first and second paths for conveying the first and second components, respectively, to said output port (28) for recombination, and means (26B) for varying the length of one of the first and second paths relative to the other to cause interference between the components upon recombination,
   (iii) a polarization separator (30) for receiving the recombined light from the output port and separating said recombined light into first and second interferograms having orthogonal polarization states,
   (iv) detection means (32$_X$,32$_Y$) for converting the first and second interferograms, respectively, into corresponding first and second electrical interferogram signals ($P_X(\tau)$, $P_Y(\tau)$), and
   (v) means (36) for processing the first and second electrical interferogram signals to produce a cross-correlation envelope ($E_C(\tau)$) and an auto-correlation envelope ($E_A(\tau)$), and determining from the cross-correlation envelope and the auto-correlation envelope the polarization mode dispersion (PMD) of the waveguide.

2. Apparatus according to claim 1, wherein the processing means (36) is operable to derive the cross-correlation envelope ($E_C(\tau)$) as the modulus of the difference between the first and second electrical interferogram signals and the auto-correlation envelope $E_A(\tau)$) as the modulus of the sum of the first and second electrical interferogram signals.

3. Apparatus according to claim 2, wherein the processing means (36) is operable to compute polarization mode dispersion (PMD) from the cross-correlation envelope ($P_C(\tau)$) and the auto-correlation envelope $E_A(\tau)$) according to the expression $$PMD = \sqrt{\frac{3}{2}(\sigma^2 - \sigma_0^2)}$$

$$\text{where } \sigma^2 = \frac{\int \tau^2 E_C^2(\tau) d\tau}{\int E_C^2(\tau) d\tau} \text{ and } \sigma_0^2 = \frac{\int \tau^2 E_A^2(\tau) d\tau}{\int E_A^2(\tau) d\tau}$$

and $\tau$ is the delay between the first and second paths of the interferometer.

4. A method of measuring polarization mode dispersion (PMD) of an optical waveguide comprising the steps of:
   (i) passing polarized broadband light through the waveguide;
   (ii) using an interferometer (20), dividing and recombining the light leaving the waveguide to produce interferograms;
   (iii) separating the recombined light into first and second interferograms having orthogonal polarization states,
   (iv) converting the first and second interferograms, respectively, into corresponding first and second electrical interferogram signals ($P_X(\tau),P_Y(\tau)$), and
   (v) processing the first and second electrical interferogram signals to produce a cross-correlation envelope ($E_C(\tau)$) and an auto-correlation envelope ($E_A(\tau)$ and determining from the cross-correlation envelope and the auto-correlation envelope the polarization mode dispersion (PMD) of the waveguide, and
   (vi) providing a signal representing the measured PMD of the waveguide.

5. A method according to claim 4, wherein the cross-correlation ($E_C(\tau)$) is derived as the modulus of the difference between the first and second electrical interferogram signals and the auto-correlation envelope $E_A(\tau)$) is derived as the modulus of the sum of the first and second electrical interferogram signals.

6. A method according to claim 5, wherein the polarization mode dispersion (PMD) is computed from the cross-correlation envelope ($E_C(-)$) and the auto-correlation envelope ($E_A(\tau)$) according to the expression $$PMD = \sqrt{\frac{3}{2}(\sigma^2 - \sigma_0^2)}$$

$$\text{where } \sigma^2 = \frac{\int \tau^2 E_C^2(\tau) d\tau}{\int E_C^2(\tau) d\tau} \text{ and } \sigma_0^2 = \frac{\int \tau^2 E_A^2(\tau) d\tau}{\int E_A^2(\tau) d\tau}$$

and $\tau$ is the delay between the first and second paths of the interferometer.

* * * * *